United States Patent
Susanto et al.

(10) Patent No.: US 9,912,267 B1
(45) Date of Patent: Mar. 6, 2018

(54) ROTOR LOCK DETECTION

(71) Applicant: Marvell International Ltd., Hamilton (BM)

(72) Inventors: Edy Susanto, Singapore (SG); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 219 days.

(21) Appl. No.: 14/997,283

(22) Filed: Jan. 15, 2016

Related U.S. Application Data (60) Provisional application No. 62/166,356, filed on May 26, 2015.

(51) Int. Cl.
*H02P 6/12* (2006.01)
*H02P 29/02* (2016.01)
*H02P 6/16* (2016.01)
*H02P 6/182* (2016.01)

(52) U.S. Cl.
CPC .......... *H02P 6/12* (2013.01); *H02P 6/16* (2013.01); *H02P 6/182* (2013.01); *H02P 29/021* (2013.01)

(58) Field of Classification Search
CPC .... H02P 6/12; H02P 6/16; H02P 6/182; H02P 29/021
USPC .................................................... 318/400.21
See application file for complete search history.

(56) References Cited

U.S. PATENT DOCUMENTS

| | | | |
|---|---|---|---|
| 2013/0201817 A1* | 8/2013 | Jiang | H04L 41/0659 370/217 |
| 2013/0342142 A1* | 12/2013 | Marcinkiewicz | H02P 6/205 318/400.11 |
| 2014/0104902 A1* | 4/2014 | Casares | H02H 3/44 363/56.01 |

* cited by examiner

*Primary Examiner* — Kawing Chan

(57) ABSTRACT

A circuit comprises a position sensing circuit to sense first and second position states of a rotating object, a first counter storing a first counter value, and a second counter storing a second counter value. The first counter value is incremented when the position states are the same, the second counter value is incremented when the position states indicate that the rotating object has rotated in a direction, and a fault is indicated when either counter value is equal to or greater than their respective limits. A method comprises sensing two position states of a rotating object, incrementing a first counter value when the position states are the same, incrementing a second counter value when the rotating object is determined, using the position states, to have rotated in a direction, and indicating a fault when either counter value is equal to or greater than their respective limits.

18 Claims, 6 Drawing Sheets

ROTOR LOCK DETECTION

CROSS REFERENCE TO RELATED APPLICATION

This present disclosure claims the benefit of U.S. Provisional Application No. 62/166,356, filed on May 26, 2015, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Brush-Less Direct Current (BLDC) motors, also known as electronically commutated synchronous motors, use electronic commutation to control magnetic fields in a stator that cause movement of a rotor. Motor control circuits sense a rotational position of the rotor, herein referred to as the position of the rotor, to control timings of the electronic commutation.

In some BLDC motors, sensors such as of Hall-effect sensors are used to determine the position of the rotor. In contrast, sensorless BLDC motors may use Back-Electro-Motive Force (Back-EMF) detection to determine the position of the rotor while the rotor is moving.

When the rotor is in a stationary position, a technique called inductive sense may be used by sensorless BLDC motors in order to kick start the spinning. Inductive sense determines a position of a magnet according to differences in an inductance of a coil caused by a proximity and a polarity of the magnet relative to the coil. Because a rotor of a BLDC motor includes one or more magnets, a motor controller may determine a position of the rotor relative to one or more coils of the BLDC motor by measuring one or more inductances of the one or more coils.

At times, a BLDC motor may experience a rotor lock event, wherein the BLDC motor is not able to spin up. A rotor lock event may occur when the rotor becomes stuck in a single position. A rotor lock may also occur when the rotor cogs, that is, when the rotor oscillates such that the rotor repeatedly rotates forwards and then backwards between a first position and a second position without performing a full rotation.

If the motor controller continues to drive the BLDC motor during a rotor lock event, the BLDC motor will consume power unnecessarily and the coils of the BLDC motor will heat up. If the motor controller continues to drive the BLDC motor during a rotor lock event for an extended period, the heating of the coils may cause a catastrophic failure of the motor. In addition, when the motor is, for example, a fan motor, the system including the fan may also fail.

Therefore, a motor controller for a BLDC motor may include a capability to detect rotor lock events.

SUMMARY

In an embodiment, a circuit comprises a position sensing circuit to sense position states of a rotating object, a first counter to store a first counter value, and a second counter to store a second counter value. The first counter value is incremented when a first position state sensed by the position sensing circuit is the same as a second position state sensed by the position sensing circuit. The second counter value is incremented when the second position state indicates that the rotating object has rotated in a first direction. The circuit indicates a fault when (i) the first counter value is equal to or greater than a first limit, or (ii) the second counter value is equal to or greater than a second limit.

In an embodiment, a method for detecting a fault is performed by a controller. The method comprises sensing a first position state of a rotating object, sensing a second position state of the rotating object, incrementing a first counter value when the second position state is the same as the first position state, determining, using the first position state and the second position state, whether the rotating object has rotated in a first direction, incrementing a second counter value when the rotating object is determined to have rotated in the first direction, and indicating a fault when (i) the first counter value is equal to or greater than a first limit or (ii) the second counter value is equal to or greater than a second limit.

DETAILED DESCRIPTION

Figure 1A:
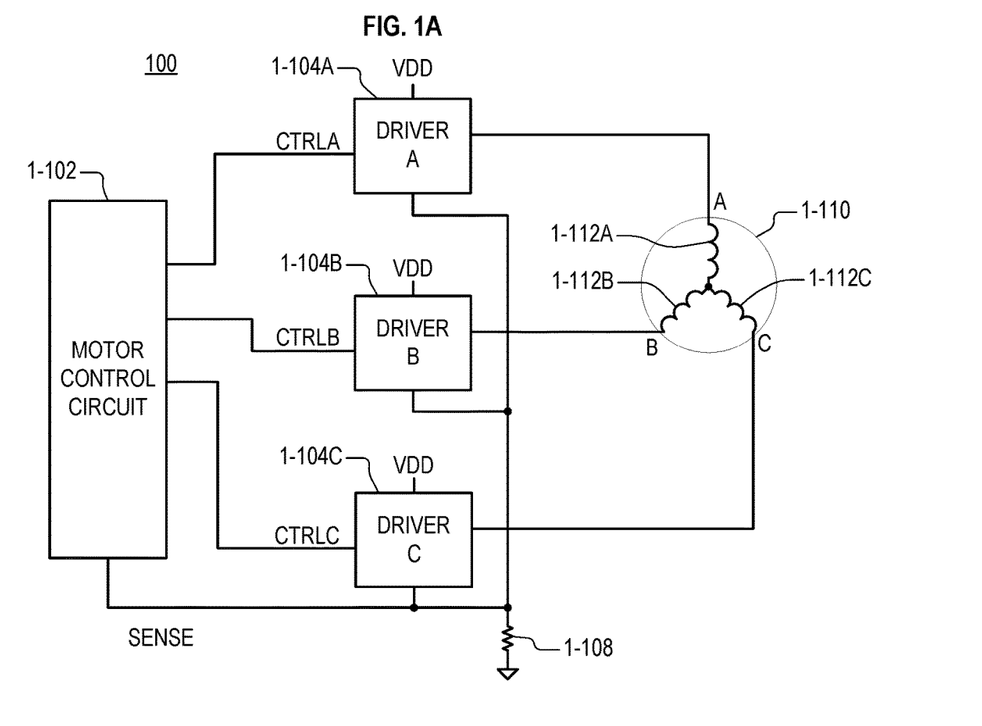
FIG. 1A illustrates a three-phase BLDC motor system according to an embodiment.

FIG. 1A illustrates a three-phase Brush-Less Direct Current (BLDC) motor system 100 according to an embodiment. The BLDC motor system 100 includes a motor control circuit 1-102, first, second, and third driver circuits 1-104A, 1-104B, and 1-104C, respectively, a current sense resistor 1-108, and a three-phase BLDC motor 1-110.

Although examples herein are described with respect to three-phase BLDC motors, embodiments are not limited thereto. For example, embodiments may be used with two phase BLDC motors.

The motor control circuit 1-102 provides first, second, and third control signals CTRLA, CTRLB, and CTRLC to the first, second, and third driver circuits 1-104A, 1-104B, and 1-104C, respectively. In an embodiment, each of the control signals CTRLA, CTRLB, and CTRLC includes a plurality of signals. The motor control circuit 1-102 senses a current flow through one or more of the driver circuits 1-104A, 1-104B, and 1-104C by measuring a voltage across the current sense resistor 1-108.

In an embodiment, the motor control circuit 1-102 includes a processor and non-transitory computer-readable media, and functions of the motor control circuit 1-102 are performed by the processor executing computer programming instructions stored on the non-transitory computer-readable media.

In an embodiment, the motor control circuit 1-102 includes a state machine circuit that performs functions of the motor control circuit 1-102. The state machine circuit may have a present state that may be any of a plurality of states. The state machine circuit may transition from the present state to a next state of the plurality of states according to the present state and values of inputs to the motor control circuit 1-102. The state machine circuit produces outputs according to the present state of the state machine circuit and the values of the inputs to the motor control circuit 1-102.

The driver circuits 1-104A, 1-104B, and 1-104C are each connected to a supply voltage VDD and connected to a ground through the current sense resistor 1-108. The driver circuits 1-104A, 1-104B, and 1-104C control first, second, and third signals supplied to first, second, and third motor terminals A, B, and C of the motor 1-110, respectively. The current sense resistor 1-108 is used to produce a current sense signal SENSE that is monitored by the motor control circuit 1-102.

The motor 1-110 includes first, second, and third windings 1-112A, 1-112B, and 1-112C, respectively, having first ends connected to the motor terminals A, B, and C, respectively. Second ends of the windings 1-112A, 1-112B, and 1-112C are connected to each other in a "wye" configuration. In another embodiment, the windings 1-112A, 1-112B, and 1-112C are connected to each other in a "delta" configuration wherein the second end of the first winding 1-112A is connected to the first end of the second winding 1-112B, the second end of the second winding 1-112B is connected to the first end of the third winding 1-112C, and the second end of the third winding 1-112C is connected to the first end of the first winding 1-112A.

Figure 1B:
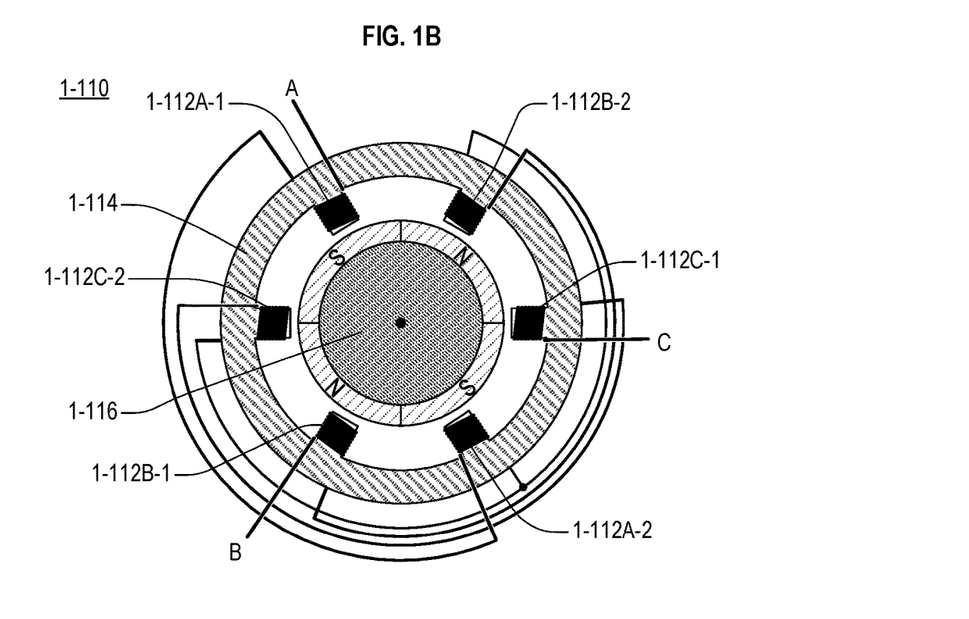
FIG. 1B illustrates additional features of a three-phase BLDC motor of FIG. 1A according to an embodiment.

FIG. 1B is a simplified cross-sectional drawing that illustrates additional features of the motor 1-110 according to an embodiment.

The motor 1-110 includes a stator 1-114. Wound on the stator 1-114 are a first coil 1-112A-1 and a fourth coil 1-112A-2 which are connected in series to form the first winding 1-112A. Also wound on the stator 1-114 are a second coil 1-112B-1 and a fifth coil 1-112B-2 which are connected in series to form the second winding 1-112B. Also wound on the stator 1-114 are a third coil 1-112C-1 and a sixth coil 1-112C-2 which are connected in series to form the third winding 1-112C.

The motor 1-110 further includes a rotor 1-116 having one or more magnets, each magnet having a pole-pair including a north pole and a south pole. In the embodiment shown in FIG. 1B, the motor 1-110 includes two pole-pairs.

A person of skill in the art in light of the present disclosure would understand that the BLDC motor system 100 may further include other circuits, such as back-EMF monitoring circuits. Such circuits are omitted in the interest of brevity. In an embodiment, all or part of the motor control circuit 1-102 and the driver circuits 1-104A, 1-104B, and 1-104C are provided in an integrated circuit.

Figure 2:
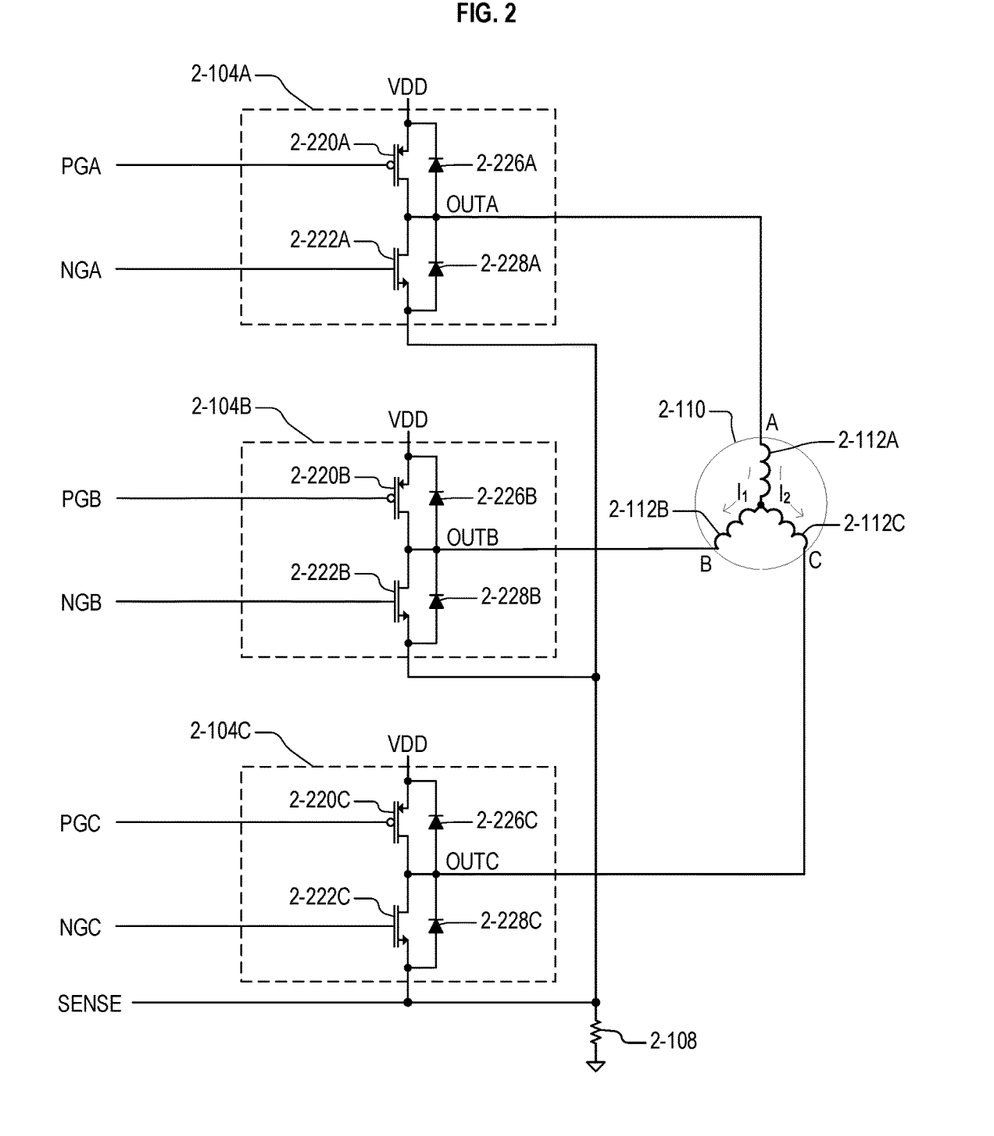
FIG. 2 illustrates driver circuits of the three-phase BLDC motor system of FIG. 1A according to an embodiment.

FIG. 2 illustrates further details of first, second, and third driver circuits 2-104A, 2-104B, and 2-104C suitable for use as the first, second, and third driver circuits 1-104A, 1-104B, and 1-104C, respectively, of the BLDC motor system 100 of FIG. 1A according to an embodiment.

The first driver circuit 2-104A receives a first positive gate signal PGA and a first negative gate signal NGA. These signals may be included in the first control signals CTRLA of FIG. 1A.

The first positive gate signal PGA is connected to a gate of a first pMOSFET 2-220A. A source of the first pMOSFET 2-220A is connected to a supply voltage VDD. A drain of the first pMOSFET 2-220A is connected to a first output terminal OUTA. A first upper protection diode 2-226A is connected between the drain and the source of the first pMOSFET 2-220A. In an embodiment, the first upper protection diode 2-226A may be a body diode of the first pMOSFET 2-220A.

The first negative gate signal NGA is connected to a gate of a first nMOSFET 2-222A. A source of the first nMOSFET 2-222A is connected to a ground through the current sense resistor 2-108. A drain of the first nMOSFET 2-222A is connected to the first output terminal OUTA. A first lower protection diode 2-228A is connected between the drain and the source of the first nMOSFET 2-222A. In an embodiment, the first lower protection diode 2-228A may be a body diode of the first nMOSFET 2-222A.

When the first positive gate signal PGA signal has a high voltage value, the first pMOSFET 2-220A is turned off and no current flows through the first pMOSFET 2-220A. When the first positive gate signal PGA has a low voltage value, the first pMOSFET 2-220A is turned on and current may flow from the supply voltage VDD through the first pMOSFET 2-220A to the first output terminal OUTA.

When the first negative gate signal NGA signal has a low voltage value, the first nMOSFET 2-222A is turned off and no current flows through the first nMOSFET 2-222A. When the first negative gate signal NGA has a high voltage value, the first nMOSFET 2-222A is turned on and current may flow from the first output terminal OUTA through the first nMOSFET 2-222A and the current sense resistor 2-108 to ground.

The second driver circuit 2-104B is substantially identical to the first driver circuit 2-104A. The second driver circuit 2-104B receives a second positive gate signal PGB and a second negative gate signal NGB. These signals may be included in the second control signals CTRLB of FIG. 1A.

The second driver circuit 2-104B includes a second pMOSFET 2-220B, a second nMOSFET 2-222B, a second upper protection diode 2-226B, and a second lower protection diode 2-228B. As shown in FIG. 2, the components of the second driver circuit 2-104B are connected in a similar manner to the components of the first driver circuit 2-104A. In an embodiment, the second upper protection diode 2-226B may be a body diode of the second pMOSFET 2-220B, and the second lower protection diode 2-228B may be a body diode of the second nMOSFET 2-222B.

When the second positive gate signal PGB signal has a high voltage value, the second pMOSFET 2-220B is turned off and no current flows through the second pMOSFET 2-220B. When the second positive gate signal PGB has a low voltage value, the second pMOSFET 2-220B is turned on and current may flow from the supply voltage VDD through the second pMOSFET 2-220B to the second output terminal OUTB.

When the second negative gate signal NGB signal has a low voltage value, the second nMOSFET 2-222B is turned off and no current flows through the second nMOSFET 2-222B. When the second negative gate signal NGB has a high voltage value, the second nMOSFET 2-222B is turned on and current may flow from the second output terminal OUTB through the second nMOSFET 2-222B and the current sense resistor 2-108 to the ground.

The third driver circuit 2-104C is substantially identical to the first driver circuit 2-104A. The third driver circuit 2-104C receives a third positive gate signal PGC and a third negative gate signal NGC. These signals may be included in the third control signals CTRLC of FIG. 1A.

The third driver circuit 2-104C includes a third pMOSFET 2-220C, a third nMOSFET 2-222C, a third upper protection diode 2-226C, and a third lower protection diode 2-228C. As shown in FIG. 2, the components of the third driver circuit 2-104C are connected in a similar manner to the components of the first driver circuit 2-104A. In an embodiment, the third upper protection diode 2-226C may be a body diode of the third pMOSFET 2-220C, and the third lower protection diode 2-228C may be a body diode of the third nMOSFET 2-222C.

When the third positive gate signal PGC signal has a high voltage value, the third pMOSFET 2-220C is turned off and no current flows through the third pMOSFET 2-220C. When the third positive gate signal PGC has a low voltage value, the third pMOSFET 2-220C is turned on and current may flow from the supply voltage VDD through the third pMOSFET 2-220C to the third output terminal OUTC.

When the third negative gate signal NGC has a low voltage value, the third nMOSFET 2-222C is turned off and no current flows through the third nMOSFET 2-222C. When the third negative gate signal NGC has a high voltage value, the third nMOSFET 2-222C is turned on and current may flow from the third output terminal OUTC through the third nMOSFET 2-222C and the current sense resistor 2-108 to ground.

Although the embodiment of the driver circuits described above includes nMOSFETs and pMOSFETs, embodiments are not limited thereto. A person of skill in the art would understand that any of a variety of three-terminal electronic devices or circuits able to amplify and switch electrical signals could be used instead of the nMOSFETs and pMOSFETs described above, including Junction Field-Effect Transistors (JFETs), bipolar junction transistors (BJTs), and combinations thereof.

Figure 3:
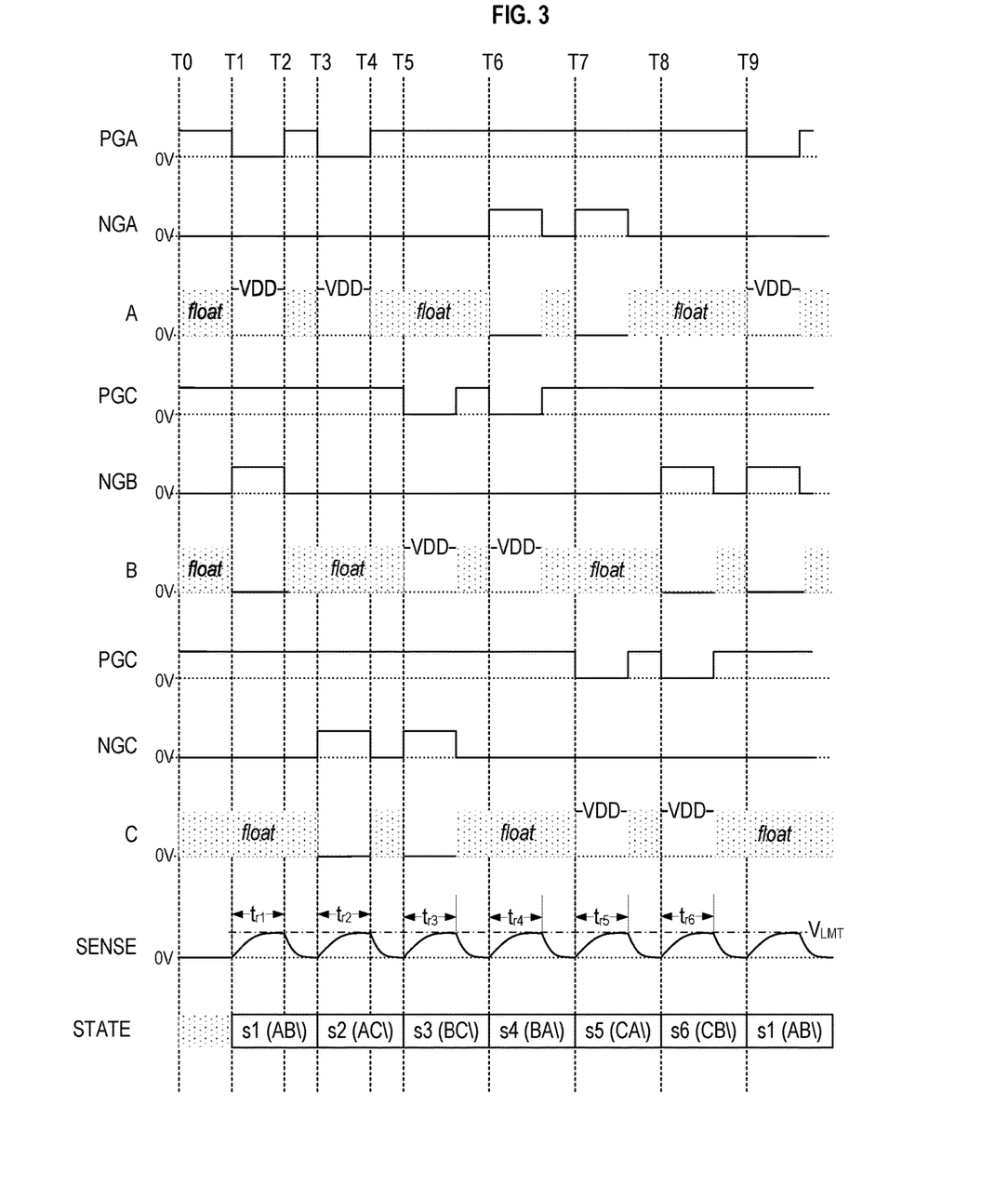
FIG. 3 is a waveform diagram illustrating an inductive sense operation of the three-phase BLDC motor system of FIG. 1A according to an embodiment.

FIG. 3 is a waveform diagram illustrating an inductive sense operation of the three-phase BLDC motor system of FIGS. 1A and 2 according to an embodiment.

At an initial (zeroth) time T0, the positive gate signals PGA, PGB, and PGC each have a value equal to the supply voltage VDD, and as a result the pMOSFETs 2-220A, 2-220B, and 2-220C are respectively turned off. The negative gate signals NGA, NGB, and NGC each have a value of 0V, and as a result the nMOSFETs 2-222A, 2-222B, and 2-222C are respectively turned off.

Because all of the pMOSFETs 2-220A, 2-220B, and 2-220C and all of the nMOSFETs 2-222A, 2-222B, and 2-222C are turned off, the respective terminals A, B, and C of the motor 2-110 float, and no current flows from any of the driver circuits 2-104A, 2-104B, and 2-104C through any of the windings 2-112A, 2-112B, and 2-112C of the motor 2-110.

At a first time T1, the first positive gate signal PGA is driven to a value of 0V. This causes the first pMOSFET 2-220A to turn on, connecting the first terminal A to the supply voltage VDD. The second negative gate signal NGB is driven to a value equal to the supply voltage VDD. This causes the second nMOSFET 2-222B to turn on, connecting the second terminal B of the motor 2-110 to the ground through the current sense resistor 2-108.

A first current $I_1$ flows through the first winding 2-112A and the second winding 2-112B according to a first inductance $L_{AB}$ of the combined first and second windings 2-112A and 2-112B and a first voltage difference $D_{V1}$ between the supply voltage VDD and a voltage at the current sense signal SENSE, which latter is initially (when the first current $I_1$=0 amps) equal to the voltage of the ground. The first current $I_1$ increases over time according to the relationship shown in Equation 1, wherein $$\frac{dI_1}{dt}$$

is the change in the first current $I_1$ over time:

$$\frac{dI_1}{dt} = \frac{D_{V1}}{L_{AB}}. \quad \text{(Equation 1)}$$

The first current $I_1$ also flows through the current sense resistor 2-108 and produce a voltage value of the current sense signal SENSE according to the value of the first current $I_1$ and a resistance value of the current sense resistor 2-108.

At a second time T2, the voltage value of the current sense signal SENSE reaches a predetermined sense limit value $V_{LMT}$. The first inductance $L_{AB}$ of the first and second windings 2-112A and 2-112B may be calculated according to (i) a first time interval between the first time T1 and the second time T2 (corresponding to a first rise time $t_{r1}$ of the first current $I_1$) and (ii) the difference $D_{V1}$ between the supply voltage VDD and the voltage at the current sense signal SENSE.

Throughout the first time interval starting at the first time T1 and ending at the second time T2, the first terminal A remains connected to the supply voltage VDD and the second terminal B remains connected to the ground through the current sense resistor 2-108. In an embodiment, the duration of the first time interval may be between 40 and 120 microseconds.

After the current sense signal SENSE reaches the predetermined sense limit value $V_{LMT}$ at the second time T2, the first positive gate signal PGA is driven to the supply voltage VDD or to another sufficiently high voltage, turning off the first pMOSFET 2-220A. The second negative gate signal NGB is driven to a value equal to ground, turning off the second nMOSFET 2-222B. As a result, the terminals A, B, and C of the motor 2-110 float. Subsequently, the first current $I_1$ decays to zero through one or more of the upper protection diodes 2-226A, 2-226B, and 2-226C and one or more of the lower protection diodes 2-228A, 2-228B, and 2-228C.

At a third time T3, the first positive gate signal PGA is driven to a value of 0V. This causes the first pMOSFET 2-220A to turn on, connecting the first terminal A to the supply voltage VDD. The third negative gate signal NGC is driven to a value equal to the supply voltage VDD. This causes the third nMOSFET 2-222C to turn on, connecting the third terminal C to the ground through the current sense resistor 2-108.

A second current $I_2$ flows through the first winding 2-112A and the third winding 2-112C according to a second inductance $L_{AC}$ of the combined first and third windings 2-112A and 2-112C and a second voltage difference $D_{V2}$ between the supply voltage VDD and the voltage at the current sense signal SENSE, which latter is initially equal to the voltage of the ground. The second current $I_2$ increases over time according to the relationship shown in Equation 2, wherein $$\frac{dI_2}{dt}$$

is the change in the second current $I_2$ over time:

$$\frac{dI_2}{dt} = \frac{D_{V2}}{L_{AC}}. \quad \text{(Equation 2)}$$

The second current $I_2$ also flows through the current sense resistor 2-108 and produce a voltage value of a current sense signal SENSE according to the value of the second current $I_2$ and the resistance value of the current sense resistor 2-108.

At a fourth time T4, the voltage value of the current sense signal SENSE reaches the predetermined sense limit value $V_{LMT}$. The second inductance $L_{AC}$ of the combined first and third windings 2-112A and 2-112C may be calculated according to (i) a second time interval between the first time T3 and the second time T4 (corresponding to a second rise time $t_{r2}$ of the second current $I_2$) and (ii) the difference $D_{V2}$ between the supply voltage VDD and the voltage at the current sense signal SENSE.

Throughout the second time interval starting at the third time T3 and ending at the fourth time T4, the first terminal A remains connected to the supply voltage VDD and the third terminal C remains connected to the ground through the current sense resistor 2-108. After the current sense signal SENSE reaches the predetermined sense limit value $V_{LMT}$ at the second time T4, the first positive gate signal PGA is driven to the supply voltage VDD or to another sufficiently high voltage, turning off the first pMOSFET 2-220A. The third negative gate signal NGC is driven to a value equal to ground, turning off the third nMOSFET 2-222C. As a result, the terminals A, B, and C of the motor 2-110 float. Subsequently, the second current $I_2$ decays to zero through one or more of the upper protection diodes 2-226A, 2-226B, and 2-226C and one or more of the lower protection diodes 2-228A, 2-228B, and 2-228C.

Similar processes to those described above as starting at the first time T1 and the third time T3 may also be performed, with the alterations shown in FIG. 3, starting at fifth, sixth, seventh, and eighth times T5, T6, T7, and T8 to produce third, fourth, fifth, and sixth rise times $t_{r3}$, $t_{r4}$, $t_{r5}$, and $t_{r6}$, respectively.

In an embodiment, the processes may be performed in a different order than the order shown in FIG. 3. For example, the process starting at the seventh time T7 and ending at the eighth time T8 may be performed subsequently to the process starting at the first time T1 and ending at the third time T3, so that a current flows from the third terminal C to the first terminal A of the motor 2-110, which is opposite to the second current $I_2$ shown in FIG. 2.

In an embodiment, not all of the first to sixth rise times $t_{r1}$ to $t_{r6}$ are determined. For example, in an embodiment, only the processes shown starting at the first time T1 and the seventh time T7 are performed so that only the first rise time $t_{r1}$ and the fifth rise time $t_{r5}$, respectively, are determined.

A person of skill in the art in light of the teachings and disclosures herein would understand that the first inductance $L_{AB}$ and the second inductance $L_{AC}$, as well as a third inductance $L_{BC}$ of the combined second and third windings 2-112B and 2-112C, may vary according to a position of a rotor of the motor 2-110. As a result, the position of the rotor of the motor 2-110 may be determined by measuring variations in two or more of the rise times described above.

When the motor 2-110 is spinning, the position of the rotor of the motor 2-110 will determine the coils that will be driven. In FIG. 3, the sensed state STATE includes first to sixth sensed states S1 to S6, respectively, corresponding to first to sixth positions, respectively, of the rotor.

The values of the positive gate signals PGA to PGC and the negative gate signals NGA to NGC occurring at the time corresponding to each sensed state S1 to S6 correspond to the values those gate signals would be driven to when the motor 2-110 was rotating and the motor control circuit 1-102 determined that the motor 2-110 was in the corresponding sensed state. For example, when the motor control circuit 1-102 determined that the rotor was in the position corresponding to the fourth sensed state S4, the motor control circuit 1-102 may drive the first negative gate signal NGA high and drive the second positive gate signal PGC low to power the continued rotation of the motor, as shown starting at sixth time T6 of FIG. 3.

In an embodiment, a plurality of the processes of measuring rise times shown in FIG. 3 may be performed before the rotor begins rotating to determine an initial position of the rotor.

Figure 4:
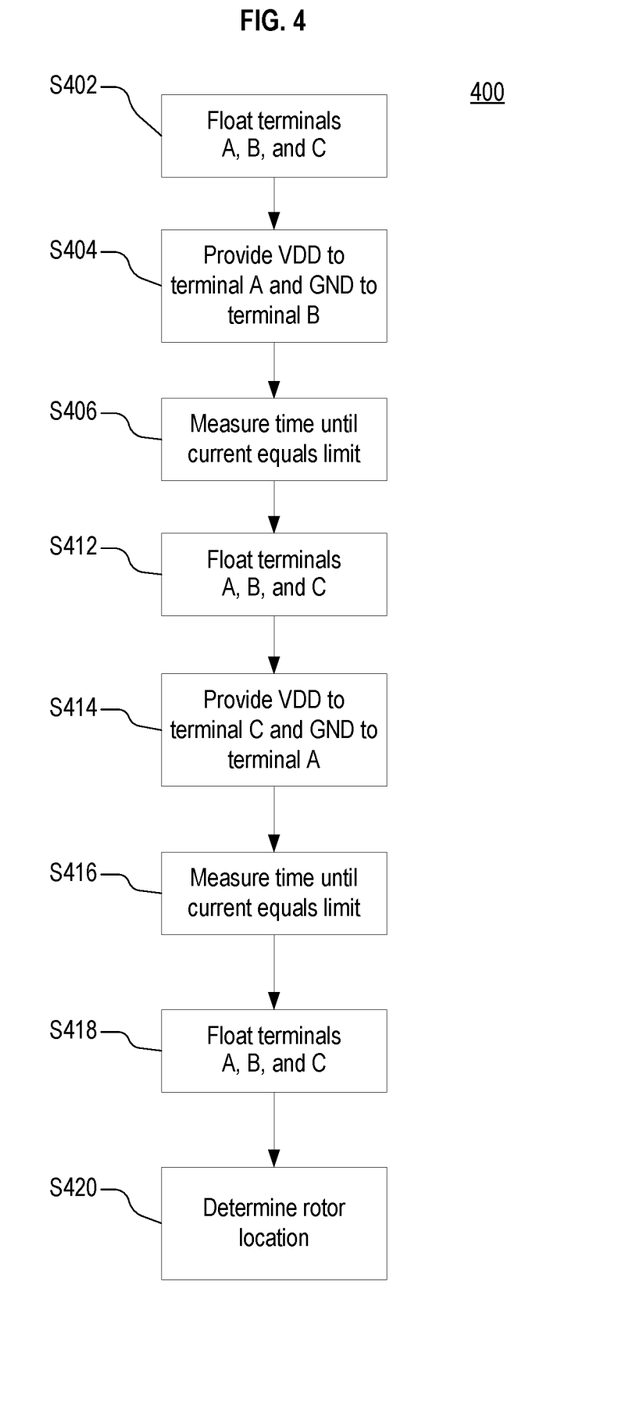
FIG. 4 is a flowchart of a process of determining a rotor position of a three-phase BLDC motor according to an embodiment.

FIG. 4 is a flowchart of a process 400 of determining a rotor position of a three-phase BLDC motor according to an embodiment.

At S402, first, second, and third terminals A, B, and C of a motor are all allowed to float.

At S404, at a first time T1, a first supply voltage is provided to the first terminal A and a second supply voltage is provided to the second terminal B. In an embodiment, the first supply voltage is a power supply voltage and the second supply voltage is a ground voltage.

A first current flowing from the first terminal A to the second terminal B is measured. In an embodiment, the first current is measured using a voltage drop across a current sense resistor.

At S406, when the first current reaches a predetermined limit at a second time T2, a first time interval between the first time T1 and the second time T2 is determined.

At S412, after the second time T2, the terminals A, B, and C of the motor are all allowed to float, and the first current decays to substantially zero.

At S414, at a third time T3, the first supply voltage is provided to the third terminal C and the second supply voltage is provided to the first terminal A. A second current flowing from the third terminal C to the first terminal A is measured.

At S416, when the second current reaches the predetermined limit at a fourth time T4, a second time interval between the third time T3 and the fourth time T4 is determined.

At S418, after the fourth time T4, the terminals A, B, and C of the motor are all allowed to float, and the second current decays to substantially zero.

At S420, a location of a rotor of the motor is determined according to the first and second time intervals.

In another embodiments, (i) the first supply voltage and second supply voltage are further applied in turn to other combinations of the terminals A, B, and C, (ii) additional time intervals for additional currents to reach the predetermined limit are determined, and (iii) the location of the rotor is determined according to the first, second, and additional time intervals.

Figure 5:
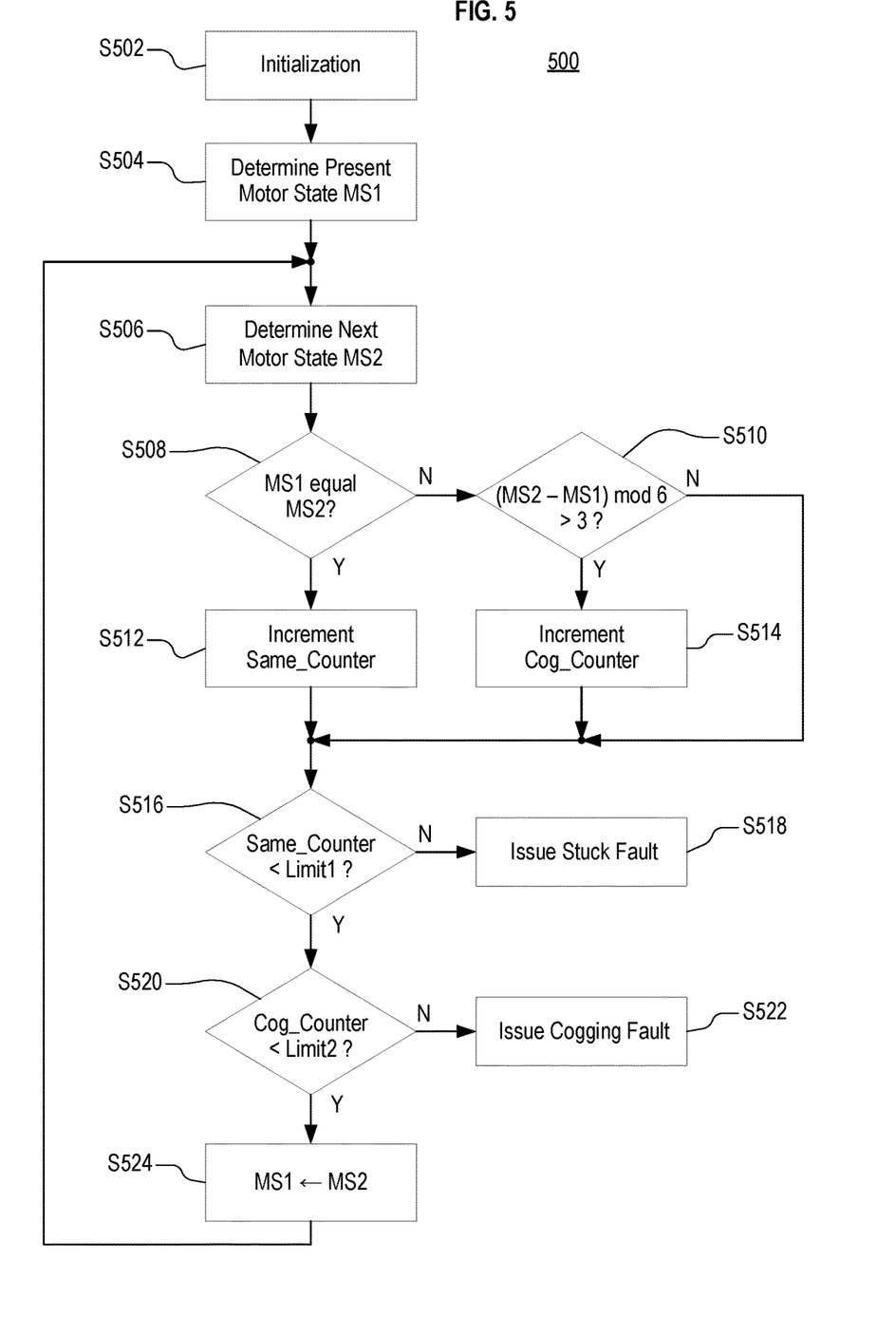
FIG. 5 is a flowchart of a process of determining faults in a three-phase BLDC motor system according to an embodiment.

FIG. 5 is a flowchart of a process 500 of determining faults in a three-phase BLDC motor system according to an embodiment. The process 500 may be performed using, for example, the motor control circuit 1-102 of the BLDC motor system 100 of FIG. 1.

In the embodiment illustrated, either of a stuck fault or a cogging fault, or both, may be determined. A stuck fault indicates that a rotor of the BLDC motor has failed to move outside of a first range of positions corresponding to a single sensed state of the BLDC motor. A cogging fault indicates that the rotor is moving inside of a second range of positions corresponding to two or more adjacent sensed states of the BLDC motor but has failed to move outside of the second range of positions, wherein the second range of positions includes less than a full (that is, 360 degrees of) rotation.

At S502, a value of a Same_Counter (that is, a first counter) and a value of a Cog_Counter (that is, a second counter) are initialized to respective predetermined values. In an embodiment, the predetermined values are 0.

At S504, a present motor state MS1 (that is, a first position state) corresponding to a position of a rotor of an electric motor is sensed. In an embodiment, the position of the rotor is sensed using the process 400 described with respect to FIG. 4.

In the embodiment of FIG. 5, the present motor state MS1 has an integer value corresponding to the numbered sensed state STATE of FIG. 3. For example, the value of the present motor state MS1 may correspond to the rotor position as follows: a value of one (1) indicates between 330 (that is, −30) and 30 degrees of rotation relative to a reference position, a value of two (2) indicates between 30 and 90 degrees of rotation, and so on, until a value of six (6) indicates between 270 and 330 degrees of rotation.

In other words, in the embodiment of FIG. 5, the value V1 of the present motor state MS1 may correspond to the position of the rotor according to Equation 3, below, wherein a is the rotation of the rotor relative to the reference position in electrical degrees, an electrical degree is equal to a rotation by a mechanical degree multiplied by a number of magnetic pole-pairs of the BLDC motor, and $\lfloor x \rfloor$ is the floor function returning the greatest integer smaller than x:

$$V1 = (\lfloor (\alpha+30)/60 \rfloor \text{ modulo } 6) + 1 \quad \text{(Equation 3)}.$$

In the embodiment of FIG. 5, forward rotation of the rotor is indicated by the value of the V1 increasing over time and then returning to one. Thus, for example, transition of the value V1 from 1 to 2, from 2 to 3, from 3 to 4, from 4 to 5, from 5 to 6, and from 6 to 1 correspond to forward movement of the rotor, and transition of the value V1 from 1 to 6, from 2 to 1, from 3 to 2, from 4 to 3, from 5 to 4, and from 6 to 5 correspond to backward movement of the rotor.

At S506, after a predetermined delay, a next motor state MS2 (that is, a second position state) corresponding to the position of the rotor is sensed. The value of the next motor state MS2 may correspond to the position of the rotor according to Equation 3, above, based on the position of the rotor after the predetermined delay.

At S508, the process 500 determines whether the value of the present motor state MS1 is the same as the value of the next motor state MS2, that is, whether the rotor is in the same sensed state as the previous sensed state. When the two values are the same, the process 500 proceeds to S512; otherwise the process 500 proceeds to S510.

At S510, the process 500 determines whether the value of the next motor state MS2 relative to the value of present motor state MS1 indicates that the rotor has moved backward. In the embodiment shown in FIG. 5, if the next motor state MS2 has a value corresponding to either of the two values that would precede the value of the present motor state MS1 during forward rotation of the rotor, the rotor is determined to have moved backwards.

Accordingly, in the embodiment of FIG. 5, the next motor state MS2 indicates that the rotor has moved backward when Equation 4, below, is true:

$$(((MS2>MS1) \text{ and } (MS2-MS1>3))$$
$$\text{or } ((MS1>MS2) \text{ and } ((6-MS1)+MS2>3))) \quad \text{(Equation 4)}.$$

For example, if the present motor state MS1 is 4 and the next motor state MS2 is 2, (6−MS1)+MS2 equals 4 and Equation 4 is true, indicating backward rotation of the rotor. If the present motor state MS1 is 1 and the next motor state MS2 is 6, (MS2−MS1) equals 5 and Equation 4 is again true, again indicating backward rotation of the rotor.

When Equation 4 is true, that is, when the rotor is sensed to have moved backward, the process 500 proceeds to S514; otherwise, the process 500 proceeds to S516.

At S512, the Same_Counter is incremented by a predetermined amount, such as one, when the next motor state MS2 is the same as the present motor state MS1. The process 500 then proceeds to S516.

At S514, the Cog_Counter is incremented by a predetermined amount, such as one, when the next motor state MS2 relative to the present motor state MS1 indicates that the rotor has moved backwards. The process 500 then proceeds to S516.

At S516, the Same_Counter is compared to a first limit Limit1. If the Same_Counter is less than the first limit Limit1, the process 500 proceeds to S520, otherwise, the process 500 proceeds to S518.

In an embodiment, the first limit Limit1 may be programmable. For example, in an embodiment, the first limit Limit1 may be programmed to be one of 16, 32, 48, and 64.

At S518, the process 500 issues a Stuck Fault indicating that the rotor is stuck within a single sensed state.

At S520, the Cog_Counter is compared to a second limit Limit2. If the Cog_Counter is less than the second limit Limit2, the process 500 proceeds to S524, otherwise, the process 500 proceeds to S522.

In an embodiment, the second limit Limit2 may be programmable. For example, in an embodiment, the second limit Limit2 may be programmed to be one of 16, 32, 48, and 64.

In an embodiment, the second limit Limit2 is the same as the first limit Limit1.

At S522, the process 500 issues a Cogging Fault indicating that the rotor is cogging.

At S524, the value of the present motor state MS1 is set to the value of the next motor state MS2. The process 500 then proceeds to S506.

In an embodiment, a motor control circuit may stop driving the motor for a period of time, may shut down for a period of time, or both, when one or more of the Stuck Fault and the Cogging Fault are issued.

In general, for a BLDC motor having P phases, P≥2, wherein the sensed state increases by 1 from 1 to N, N=2·P, and then back to 1 as a rotor of the P-phase BLDC motor rotates forward 360 electrical degrees, the process 500 may be adapted by changing S510 so that the next motor state MS2 indicates that the rotor has moved backward when Equation 5, below, is true:

$$(((MS2>MS1) \text{ and } (MS2-MS1>N/2))$$

$$\text{or } ((MS1>MS2) \text{ and } ((N-MS1)+MS2>N/2))) \quad \text{(Equation 5)}.$$

Figure 6:
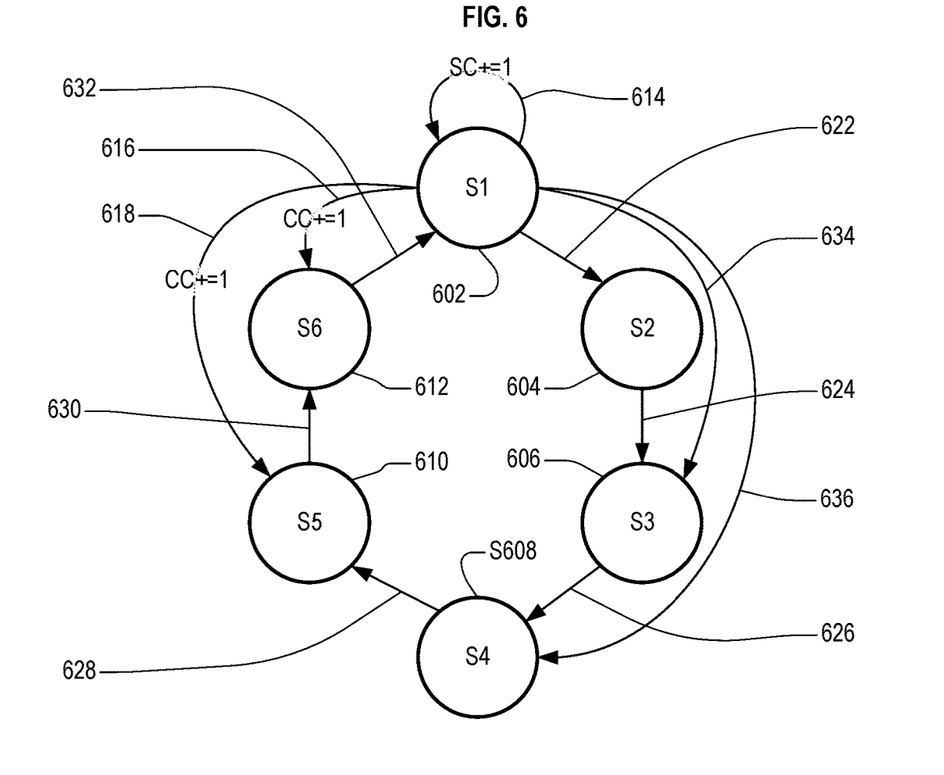
FIG. 6 is a state machine diagram illustrating operations of the process of FIG. 5 according to an embodiment.

FIG. 6 is a state machine diagram illustrating some operations of the process 500 of FIG. 5 according to an embodiment. In particular, FIG. 6 shows the operations performed by the process 500 when the present motor state MS1 indicates the rotor is in state S1 of FIG. 3, according to the state of the rotor indicated by the next motor state MS2.

Each state circle in FIG. 6 indicates the state that will be indicated by the present motor state MS1 after the pertinent transition. Thus, first, second, third, fourth, fifth and sixth state circles 602, 604, 606, 608, 610, and 612 respectively indicate rotor states S1, S2, S3, S4, S5, and S6 of FIG. 3, respectively. Transitions 622, 624, 626, 628, 630, and 632 each illustrate state transitions between sequential rotor states during forward rotation of the rotor.

When the present motor state MS1 indicates the state S1 and the next motor state MS2 indicates the state S1, a stuck count SC is incremented by one (1), a cog count CC is left unchanged, and the present motor state MS1 continues to indicate the state S1, as indicated by a transition 614.

When the present motor state MS1 indicates the state S1 and the next motor state MS2 indicates the state S2, the stuck count SC is left unchanged, the cog count CC is left unchanged, and the present motor state MS1 is altered to indicate the state S2, as indicated by the transition 622.

When the present motor state MS1 indicates the state S1 and the next motor state MS2 indicates the state S3, the stuck count SC is left unchanged, the cog count CC is left unchanged, and the present motor state MS1 is altered to indicate the state S3, as indicated by a transition 634.

When the present motor state MS1 indicates the state S1 and the next motor state MS2 indicates the state S4, the stuck count SC is left unchanged, the cog count CC is left unchanged, and the present motor state MS1 is altered to indicate the state S4, as indicated by a transition 636.

When the present motor state MS1 indicates the state S1 and the next motor state MS2 indicates the state S5, the stuck count SC is left unchanged, the cog count CC is incremented by one (1), and the present motor state MS1 is altered to indicate the state S5, as indicated by a transition 618.

When the present motor state MS1 indicates the state S1 and the next motor state MS2 indicates the state S6, the stuck count SC is left unchanged, the cog count CC is incremented by one (1), and the present motor state MS1 is altered to indicate the state S6, as indicated by a transition 616.

Further aspects of the present disclosure relate to one or more of the following clauses.

In an embodiment, a circuit comprises a position sensing circuit to sense position states of a rotating object, a first counter to store a first counter value, and a second counter to store a second counter value. The first counter value is incremented when a first position state sensed by the position sensing circuit is the same as a second position state sensed by the position sensing circuit. The second counter value is incremented when the second position state indicates that the rotating object has rotated in a first direction. The circuit indicates a fault when (i) the first counter value is equal to or greater than a first limit, or (ii) the second counter value is equal to or greater than a second limit.

In an embodiment, a sensed position state is an integer in the range of 1 to N, N≥6, that increases from 1 to N and then returns to 1 as the rotating object rotates 360 degrees in a second direction opposite to the first direction. The second position state indicates that the rotating object has rotated in the first direction when the equation (((MS2>MS1) and (MS2−MS1>N/2)) or ((MS1>MS2) and ((N−MS1)+MS2>N/2))) is true, wherein MS2 is the sensed position state corresponding to the second position state and MS1 is the sensed position state corresponding to the first position state.

In an embodiment, the first limit is the same as the second limit.

In an embodiment, the circuit indicates a stuck fault when the first counter value is equal to or greater than the first limit.

In an embodiment, the circuit indicates a cogging fault when the second counter value is equal to or greater than the second limit.

In an embodiment, the rotating object is included in a Brush-Less Direct Current (BLDC) motor.

In an embodiment, the first limit is programmable.

In an embodiment, the position sensing circuit uses Back-Electro-Motive Force (Back-EMF) detection to determine the position of the rotating object.

In an embodiment, the position sensing circuit uses inductive sense to determine the position of the rotating object.

In an embodiment, the position sensing circuit uses one or more Hall effect sensors to determine the position of the rotating object.

In an embodiment, the circuit is provided in an integrated circuit.

In an embodiment, a method is performed by a controller for detecting a fault. The method comprises sensing a first position state of a rotating object, sensing a second position state of the rotating object, incrementing a first counter value when the second position state is the same as the first position state, determining, using the first position state and the second position state, whether the rotating object has rotated in a first direction, incrementing a second counter value when the rotating object is determined to have rotated in the first direction, and indicating a fault when (i) the first counter value is equal to or greater than a first limit or (ii) the second counter value is equal to or greater than a second limit.

In an embodiment, a sensed position state is an integer in the range of 1 to N, N≥6, that increases from 1 to N and then returns to 1 as the rotating object rotates 360 degrees in a second direction opposite to the first direction. The second position state indicates that the rotating object has rotated in the first direction when the equation (((MS2>MS1) and ((MS2−MS1>N/2)) or ((MS1>MS2) and ((N−MS1)+MS2>N/2))) is true, wherein MS2 is the sensed position state corresponding to the second position state and MS1 is the sensed position state corresponding to the first position state.

In an embodiment, the rotating object is included in a Brush-Less Direct Current (BLDC) motor.

In an embodiment, the method further comprises indicating a stuck fault when the first counter value is equal to or greater than the first limit.

In an embodiment, the method further comprises indicating a cogging fault when the second counter value is equal to or greater than the second limit.

In an embodiment, the method further comprises initializing the first counter value to a predetermined value, and initializing the second counter value to the predetermined value.

In an embodiment, the method further comprises setting the first position state to be equal to the second position state.

In an embodiment, the first limit is the same as the second limit.

In an embodiment, the method further comprises using inductive sense to sense the first position state, the second position state, or both.

In an embodiment, the method further comprises using one or more Hall effect sensors to sense the first position state, the second position state, or both.

In an embodiment, the method further comprises using Back-Electro-Motive Force (Back-EMF) detection to sense the first position state, the second position state, or both.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A circuit comprising:
   a position sensing circuit to sense position states of a rotating object;
   a first counter to store a first counter value; and
   a second counter to store a second counter value,
   wherein the first counter value is incremented when a first position state sensed by the position sensing circuit is the same as a second position state sensed by the position sensing circuit,
   wherein the second counter value is incremented when the second position state indicates that the rotating object has rotated in a first direction, and
   wherein the circuit indicates a fault when (i) the first counter value is equal to or greater than a first limit, or (ii) the second counter value is equal to or greater than a second limit, (iii) or both,
   wherein a sensed position state is an integer in the range of 1 to N, N>6, that increases from 1 to N and then returns to 1 as the rotating object rotates 360 electrical degrees in a second direction opposite to the first direction, and
   wherein the second position state indicates that the rotating object has rotated in the first direction when the following equation:

$(((MS2>MSI) \text{ and } (MS2-MSI>N/2)) \text{ or } ((MSI>MS2) \text{ and } ((N-MS1)+MS2>N/2>>)$ is true, wherein MS2 is the sensed position state corresponding to the second position state and MSI is the sensed position state corresponding to the first position state.

2. The circuit of claim 1, wherein the first limit is the same as the second limit.

3. The circuit of claim 1, wherein the circuit indicates a stuck fault when the first counter value is equal to or greater than the first limit and indicates a cogging fault when the second counter value is equal to or greater than the second limit.

4. The circuit of claim 1, wherein the rotating object is included in a Brush-Less Direct Current (BLDC) motor.

5. The circuit of claim 1, wherein the first limit is programmable.

6. The circuit of claim 1, wherein the position sensing circuit uses Back-Electro-Motive Force (Back-EMF) detection to determine the position of the rotating object.

7. The circuit of claim 1, wherein the position sensing circuit uses inductive sense to determine the position of the rotating object.

8. The circuit of claim 1, wherein the position sensing circuit uses one or more Hall effect sensors to determine the position of the rotating object.

9. The circuit of claim 1, wherein the circuit is provided in an integrated circuit.

10. A method for detecting a fault, the method comprising:
    sensing a first position state of a rotating object;
    sensing a second position state of the rotating object;
    incrementing a first counter value when the second position state is the same as the first position state;
    determining, using the first position state and the second position state, whether the rotating object has rotated in a first direction;
    incrementing a second counter value when the rotating object is determined to have rotated in the first direction; and
    indicating a fault when (i) the first counter value is equal to or greater than a first limit or (ii) the second counter value is equal to or greater than a second limit, or (iii) both,
    wherein a sensed position state is an integer in the range of 1 to N, N>6, that increases from 1 to N and then returns to 1 as the rotating object rotates 360 electrical degrees in a second direction opposite to the first direction, the method further comprising:
    determine that the rotating object has rotated in the first direction when the equation:

$(((MS2>MSI) \text{ and } (MS2-MSI>N/2)) \text{ or } ((MSI>MS2) \text{ and } ((N-MS1)+MS2>N/2>>)$ is true, wherein MS2 is the sensed position state corresponding to the second position state, and wherein MSI is the sensed position state corresponding to the first position state.

11. The method of claim 10, wherein the rotating object is included in a Brush-Less Direct Current (BLDC) motor.

12. The method of claim 10, further comprising:
    indicating a stuck fault when the first counter value is equal to or greater than the first limit; and
    indicating a cogging fault when the second counter value is equal to or greater than the second limit.

13. The method of claim 10, further comprising:
    initializing the first counter value to a predetermined value; and
    initializing the second counter value to the predetermined value.

14. The method of claim 10, further comprising setting the first position state to be equal to the second position state.

15. The method of claim 10, wherein the first limit is the same as the second limit.

16. The method of claim 10, further comprising using inductive sense to sense the first position state, the second position state, or both.

17. The method of claim 10, further comprising using one or more Hall effect sensors to sense the first position state, the second position state, or both.

18. The method of claim 10, further comprising using Back-Electro-Motive Force (Back-EMF) detection to sense the first position state, the second position state, or both.

* * * * *